United States Patent [19]

Lewis

[11] Patent Number: 4,509,051
[45] Date of Patent: Apr. 2, 1985

[54] PHASE-CODED PULSE EXPANDER-COMPRESSOR

[75] Inventor: Bernard L. Lewis, Fort Washington, Md.

[73] Assignee: The United States of America as represented by the Secretary of the Navy, Washington, D.C.

[21] Appl. No.: 420,209

[22] Filed: Sep. 20, 1982

[51] Int. Cl.³ ............................................. G01S 13/28
[52] U.S. Cl. .......................... 343/17.2 PC; 343/5 FT; 364/726
[58] Field of Search ...................... 343/17.2 PC, 5 FT; 364/726

[56] References Cited

U.S. PATENT DOCUMENTS

| 3,249,940 | 5/1966  | Erickson        | 343/17.1 R |
| 3,777,131 | 12/1973 | Liewellyn       | 364/726    |
| 4,001,820 | 1/1977  | Rosenbaum et al.| 343/5 SA   |
| 4,237,461 | 12/1980 | Cantrell et al. | 343/5 FT   |

OTHER PUBLICATIONS

"Radar Handbook", M. I. Skolnik, Ed. pp. 35-15 and 35-16.
U.S. patent application Ser. No. 377,108, F. Kretschmer.
U.S. patent application Ser. No. 377,106, F. Kretschmer.

Primary Examiner—Maynard R. Wilbur
Assistant Examiner—Gilberto Barron, Jr.
Attorney, Agent, or Firm—Robert F. Beers; William T. Ellis; Alan P. Klein

[57] ABSTRACT

A pulse expansion and compression system, especially useful for radar ranging, comprising a pulse coder for expanding an input pulse and a pulse compressor of the matched-filter type. The coder consists of a plurality of delay stages into which the input pulse is fed, a discrete Fourier transform (DFT) circuit to which the output signals of the delay stages are fed by way of respective phase weights and for which every other frequency port is inverted prior to entry to a time-dispersion-means (TDM) comprising an arrangement of adders interconnected by delay stages for differently delaying the output signals from the DFT. The adders are connected in N/2-fold cyclically permutated order to the frequency ports, where N is the number of frequency ports if that number is even, and N is the number of frequency ports less one if that number is odd. The TDM output is fed to a phase modulator and then to the transmitter. The echo signals are conjugated, time-inverted, and passed through the same DFT as the input pulse signal by way of the phase weights. The outputs of the DFT are then inverted at every other frequency port and passed through the TDM, but this time in time-inverted order. The outputs of the TDM are fed through an envelope detector to provide a cross-correlated facsimile of the original input pulse.

9 Claims, 7 Drawing Figures

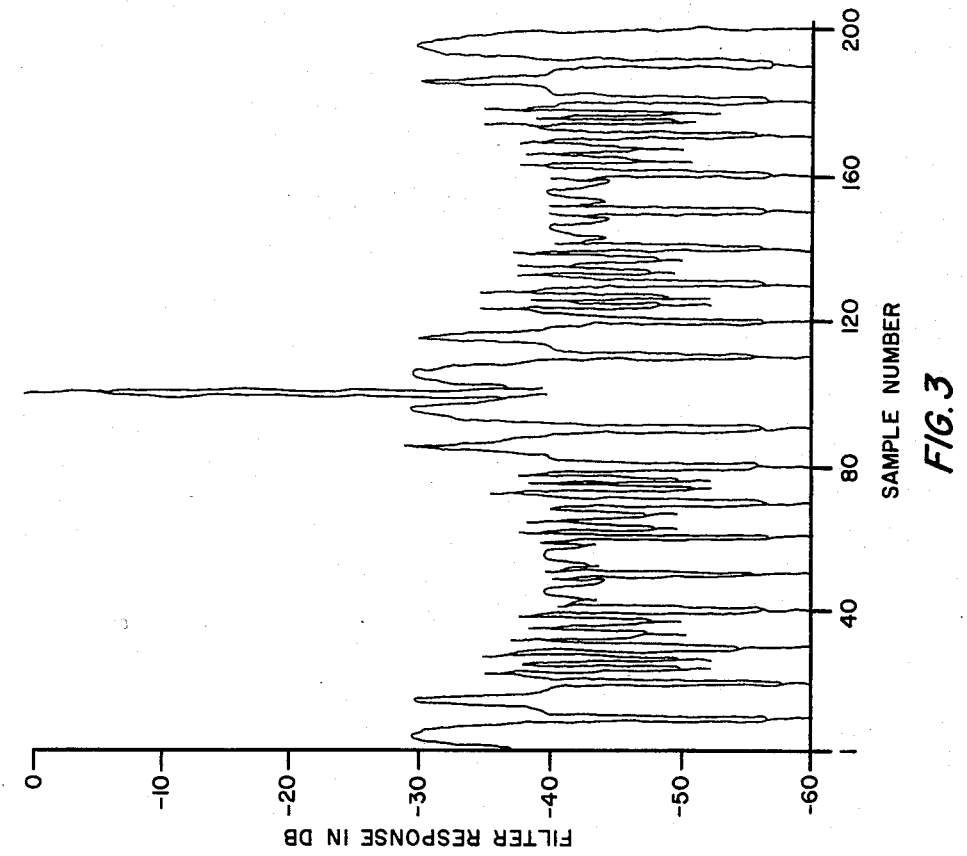
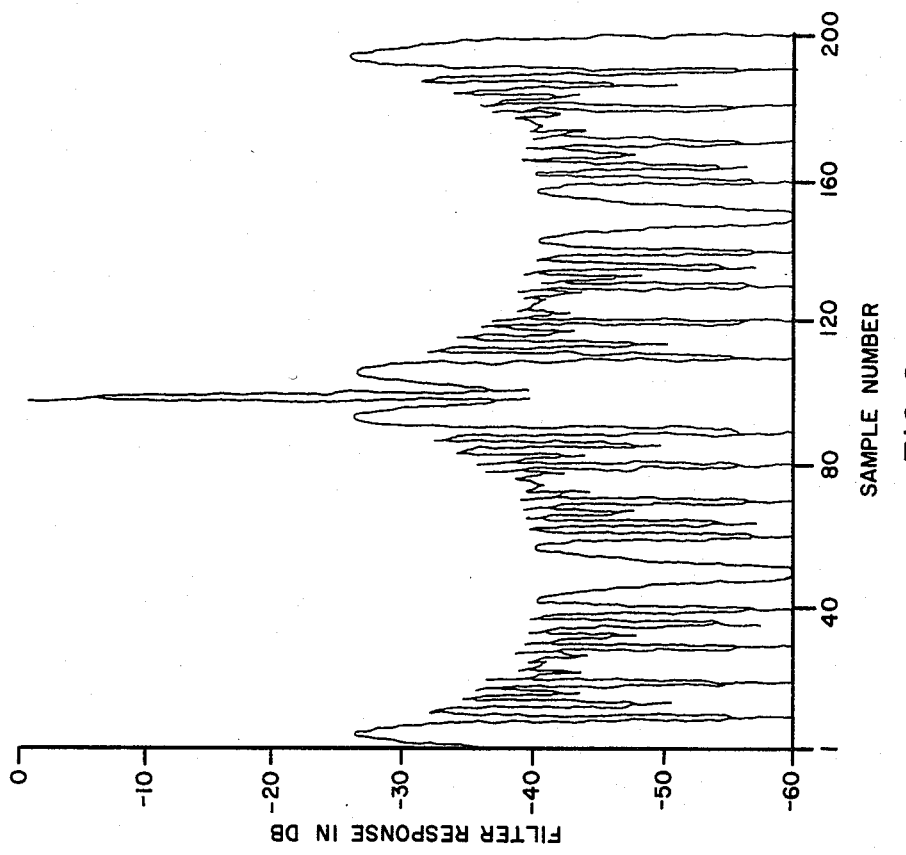

PHASE-CODED PULSE EXPANDER-COMPRESSOR

BACKGROUND OF THE INVENTION

The invention relates to pulse-compression techniques, and more particularly to a pulse-compression technique using a fast Fourier transform circuit in a matched filter.

It is known to raise the average transmitted power of a given radar by expanding the pulse length and simultaneously keeping a constant bandwidth so that the range resolution capability of the radar is not reduced. To achieve this, a long pulse containing some sort of a linear frequency modulation or stepwise approximation to a linear frequency modulation is transmitted. Upon reception, the pulse is compressed to permit separation of adjacent range resolution cells.

U.S. Pat. No. 4,237,461 to Ben H. Cantrell on Dec. 2, 1980, discloses a digital pulse-expander-compressor which uses a stepwise approximation to a linear frequency modulation.

This device has poor Doppler tolerance. That is, the autocorrelation function or compressed-pulse waveform that is obtained with the device exhibits large range-time grating lobes in the presence of large Doppler shifts on the echo pulses. These large grating lobes are undesirable as they may give rise to false detections and range, if time discrimination is used to calculate range.

This device also has poor precompression bandwidth tolerance. Before the received pulse is compressed, it is fed to a sample-and-A/D converter. The sample-and-A/D converter produces out-of-band interference and noise foldover as a part of its output. To reject the interference and noise foldover, the receiver is given an approximately rectangular passband. The limited receiver bandwidth results, however, in an unfavorable mismatch to the pulse. This mismatch causes a degradation in the peak-to-sidelobe ratio of the autocorrelation function or compressed-pulse waveform obtained with the device. This degradation is undesirable because it increases the possibility that weak target echos will be hidden by the sidelobes from an adjacent stronger target echo.

SUMMARY OF THE INVENTION

It is therefore an object of this invention to provide a digital pulse expander-compressor that does not develop large range-time-sidelobes with Doppler frequency shifts of the echo from a target.

Another object is to provide such a compressor that is tolerant of precompression bandwidth limitations.

A further object is to realize such a compressor using a minimum amount of hardware.

These and other objects of the invention are achieved by an improvement in a digital pulse expander-compressor. The improvement includes input-signal expansion means which is responsive to an applied pulse for successively generating N replicas $y(n)$ of the pulse, where $n=0,1,2,\ldots,N-1$ and N is an integer, in a time which is N times the length of the pulse. Also included is a weighting means which is connected to the input-signal expansion means and has N output terminals for weighting the replicas $y(n)$ in accordance with the formula $$z(k) = \sum_{n=0}^{N-1} y(n)e^{-j\pi(k + \frac{2nk}{N} + \frac{n2}{N2})}$$

where $k=0,1,2,\ldots,N-1$ to provide N weighted pulses $z(k)$, each at a respective one of the N output terminals, whenever one of the N replicas $y(n)$ is generated. A time-dispersion means is connected to the weighting means for delaying each of the N weighted pulses $z(k)$ corresponding to any replica of the applied pulse by a time which is determined by cyclically permutating, R/2 times, the values of k assigned to the N weighted pulses, and then multiplying the newly assigned value of k of said each one of the N weighted pulses $z(k)$ by N times the length of the applied pulse. R equals N if N is an even integer, and R equals (N−1) if N is an odd integer.

This invention permits a minimum amount of hardware to be used to generate and compress a highly Doppler-tolerant and precompression bandwidth-tolerant polyphase code.

Additional advantages and features will become apparent as the subject invention becomes better understood by reference to the following detailed description when taken in conjunction with the accompanying drawings wherein:

BRIEF DESCRIPTION OF THE DRAWINGS

FIG. 2 is the autocorrelation function obtained with the pulse-expander-compressor shown in FIG. 1 when subject to no Doppler shift and no bandwidth limitation.

FIG. 3 is the autocorrelation function obtained with the prior art pulse-expander-compressor when subject to no Doppler shift and no bandwidth limitation.

DESCRIPTION OF THE PREFERRED EMBODIMENT

Figure 1:
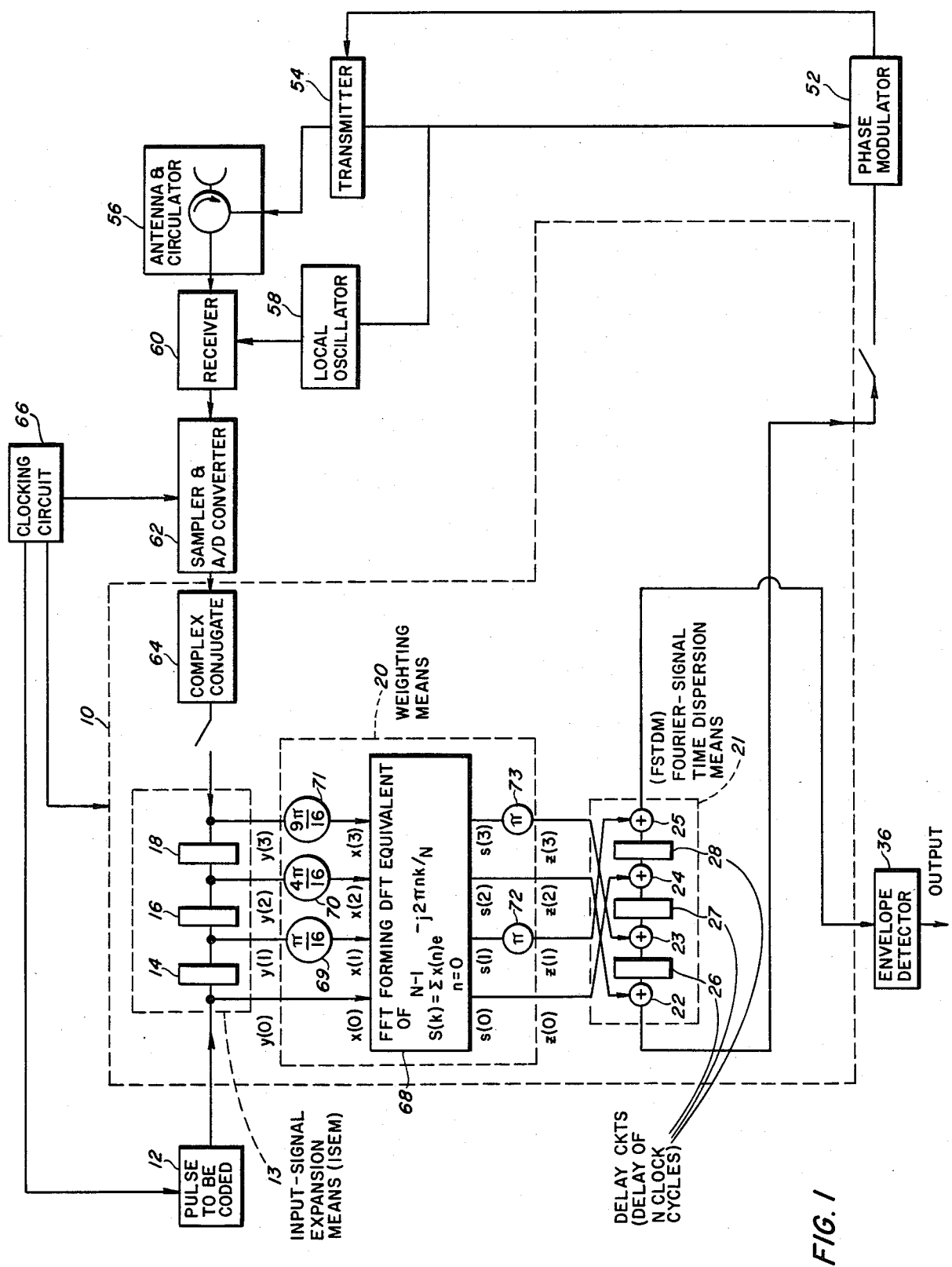
FIG. 1 is a block diagram of an embodiment of the invention.

An embodiment of the invention is shown in FIG. 1 as it might be used as part of a pulse-compression radar. The components of the invention are enclosed in the dashed lines. In brief, the system operates in the following manner. The input signal is a pulse produced by a pulse generator 12, for example. The pulse is clocked into an input-signal expansion means (ISEM) 13 providing three equal intervals of delay. The ISEM may comprise three stages 14, 16, 18 of a shift register or a delay line tapped at equal delay intervals, for example. Outputs are taken from the input to the first delay stage, the output of the first delay stage, the output of the second delay stage, and the output of the third delay stage, viz., y(0), y(1), y(2), y(3), respectively. During the first clock interval the pulse to be coded is clocked out of the pulse generator 12 and put on the input line to the first delay stage 14; during the second clock interval the pulse at the input of the first delay stage 14 passes through the stage and appears at its output with the proper delay; and so on. The clocking circuit is shown in simplified form in block 66. The ISEM 13 essentially provides for time expansion of the input pulse. It provides four input signals to the weighting means 20 viz., 1000, 0100, 0010 and 0001, in a time which is four times as long as that of the input pulse. (Presence of a pulse is denoted by a 1, absence of a pulse by a 0.)

The signals y(0), y(1), y(2) and y(3) are fed into a weighting means 20 which weights the signals in accordance with the formula $$z(k) = \sum_{n=0}^{N-1} y(n) e^{-j\pi(k + \frac{2nk}{N} + \frac{n2}{N2})}$$

The weighting means 20 provides four output signals, z(0), z(1), z(2), and z(3) for each input signal to the weighting means. In the formula, the y(n) are the output signals taken from the input to delay stage 14 and from the output of delay stages 14, 16, and 18; n is the number of the output signal being taken from the delay stages (n=0 for the output signal taken from the input to delay stage 14, and n=1,2,3 for the output signals taken from the outputs of delay stages 14, 16, and 18, respectively); and N is the number of delay stages plus one, since a pulse is being taken off just prior to the first stage 14. In the example shown n=0, . . . , 3, k=0, . . . , 3, N=4, although many more delay stages and outputs from the weighting means could be used, as well as fewer. In fact as little as one delay stage could be used.

The output signals from the weighting means are individually fed to Fourier signal time-dispersion means 21 (PSTDM). This delays each of the four output signals, z(0), z(1), z(2) and z(3), corresponding to any input signal to the weighting means, by a time which is a multiple of N clock signals, where the multiple varies according to the output signal under consideration. The value of the multiple for a particular output signal is determined by cyclically permutating the values of k assigned to the output signals R/2 times, where R equals N if N is an even integer, and R equals (N−1) if N is an odd integer. The newly assigned value of k is the multiple for the particular output signal. The term "cylic permutation" is used herein in its conventional sense as meaning a permutation in which a set of symbols is rearranged by putting for each the one that follows and the first for the last, or inversely. In the example shown, N=4 and each of the output signals, z(0), z(1), z(2) and z(3) is delayed by a time which is a respective multiple of 4 clock intervals. The 2-fold cyclically permutated values of k are 2,3,0 and 1. Thus, the signal z(0) has a delay of 2×4=8 intervals, signal z(1) a delay of 3×4=12 intervals, signal z(2) no delay, and signal z(3) a delay of 1×4=4 intervals.

The outputs of the FSTDM 21 are a series of complex signals carried on composite leads comprising separate I (inphase) and Q (quadrature) lines. A single signal with a real and an imaginary part is formed for each clocking interval. These signals are fed to a phase modulator 52 which phase-modulates the carrier signal of the transmitter 54 and the modulated carrier is propagated into space by the antenna 56.

The return signals are received, processed by the receiver 60, and fed to a sampler-and-A/D converter 62 which returns them to sample digital form.

These digital echo signals are in complex form and are fed to a conjugator circuit 64 which processes them to form their complex conjugates. These conjugate signals are fed back through the ISEM 13 is inverted order relative to the manner in which the original input pulse passed through the ISEM 13. The delayed outputs are again fed to the weighting means 20 whose output signals are fed to the Fourier signal time-dispersion means (FSTDM) 21 to provide delays for the signals z(0), z(1), z(2) and z(3) which are inverted in order relative to the delays provided by the FSTDM 21 for the outgoing weighting means signals. The output of the FSTDM 21 is a cross-correlated signal which is then detected by an envelope detector 36.

The output of the FSTDM 21 is the impulse response of a matched filter which comprises complex conjugator 64, input-signal expansion means 13, weighting means 20, and time-dispersion means 21. A matched filter provides an impulse response which is the complex-conjugate, time-inverted, equivalent of the input pulse. The conjugator 64 provides the complex conjugation of the echo signals and the expansion means 13 and time-dispersion means 21 provide the time inversion of the echo signal. The matched filter also effects convolution of the received signals with the input signal. The replica of the input signal in this device is actually a product of the operation of the weighting means 20.

While the weighting means 20 may take a variety of forms, conveniently it may take the form shown in FIG. 1 of a fast Fourier (FFT) circuit 68, which forms discrete Fourier transform (DFT) signals; a plurality of phase-shifters 69–71 of which a respective phase shifter is connected to every input of the DFT 68 except the first input; and a plurality of inverters 72–73 of which a respective inverter is connected to every other output of the DFT 68. The phase-shifters 69–71 and the input to the first delay stage 14 provide outputs x(n) in accordance with the formula $$x(n) = y(n) e^{-j\pi n2/N2}$$

In the formula, the y(n) are the output signals taken from the input to delay stage 14 and from the output of delay stages 14, 16 and 18, n is the number of the output signal being taken from the delay stages (n=0 for the output signal taken from the input to delay stage 14, and n=1,2,3 for the output signals taken from the outputs of delay stages 14, 16 and 18, respectively); and N is the number of delay stages plus one, since a pulse is being taken off just prior to the first stage 14. The output signals x(n) are individually fed to the DFT 68 which provides outputs s(k) in accordance with the formula $$s(k) = \sum_{n=0}^{N-1} x(n) e^{-j2\pi nk/N}$$

In the formula, k is the number of the output signal being taken from the DFT 68. Every other output of the DFT 68 is inverted by the inverters 72–73, so that the outputs z(k) of the weighting means 20 are provided to the FSTDM in accordance with the formula $$z(k) = s(k) e^{-j\pi k}$$

In the example shown n=0, . . . 3, k=0, . . . 3, N=4, although many more delay stages and outputs from the weighting means could be used, as well as fewer. In fact, as little as one delay stage could be used. The phase shifts associated with phase shifters 69–71 are $(\pi/16)$, $(4\pi/16)$, and $(9\pi/16)$ respectively. A detailed discussion of the discrete Fourier transform can be read in "Digital Signal Processing", Oppenheim and Schafer, published in 1975 by Prentice-Hall, Inc., Englewood Cliffs, N.J. Various ways of implementing the DFT are shown, in particular, see Chap. 6, FIG. 6.10.

While the time-dispersion means 21 may take a variety of forms, conveniently it may take the form shown in FIG. 1 of a plurality of adders 22–25 and delay stages 26–28 connected in series, with the adders alternating with the delay stages, and each adder being connected to a respective one of the N output terminals of the weighting means 20. Each delay stage 26, 27, or 28 provides a delay that is N clock intervals long. The adders are connected in R/2-fold cyclically permutated order to the N output terminals, where R equals N if N is an even integer, and R equals (N−1) if N is an odd integer. In the example shown wherein N=4, if the adders and the outputs of the weighting means are numbered from left to right in ascending material order, the third adder, 24, is connected to the first output, the fourth adder, 25, to the second output, the first adder, 22, to the third output, and the second adder, 23, to the fourth output. The delay stages 26, 27 or 28 provide a delay that is 4 clock intervals long. The delay stage 26 interconnects the first adder 22 and the second adder 23. The delay stage 27 interconnects the second adder 23 and the third adder 24. The delay stage 28 interconnects the third adder 24 and the fourth adder 25. The output of the first adder is fed to the phase modulator 52; the output of the fourth adder is fed to the envelope detector 36.

The operation of the present invention may be explained as follows:

and sent through a sampler-and-A/D converter circuit 62 which converts the phase-modulated carrier into a digitized signal again. The complex conjugate of the digitized signal is taken and fed to the ISEM 13, but the ISEM delays are now in time-inverted order, that is, y(3) now has no delay, y(2) is delayed one clock interval, y(1) two clock intervals and y(0) three clock intervals. The time-inverted, delayed echo signals are fed through the weighting means 20 to the FSTDM 21 to provide delays which are inverted in order relative to the delays provided by the FSTDM 21 for the outgoing weighting means signals. Thus, no delay is inserted in signal z(1), four units of delay in z(0), eight units of delay in z(1), and twelve units of delay in z(2). The output of the FSTDM 21 has a peak pulse in the sixteenth clock pulse interval, which can be seen in FIG. 2, the output of the envelope detector 36.

FIG. 2 illustrates the autocorrelation function or compressed pulse waveform that is obtained with the digital pulse-expander-compressor shown in FIG. 1 with no Doppler shift and no precompression bandwidth limitation. The sample number corresponds to a range cell in time in a radar. In this case, the pulse compression ratio p=100 and the highest range-time sidelobe is 4p below the peak response. For comparison purposes, FIG. 3 illustrates the autocorrelation function that is obtained with the Cantrell digital pulse-expander-compressor (shown in the above-referenced U.S. Pat. No. 4,237,461) with no Doppler and no bandwidth limitation—it has 4-db lower peak range-time sidelobes.

Figure 5:
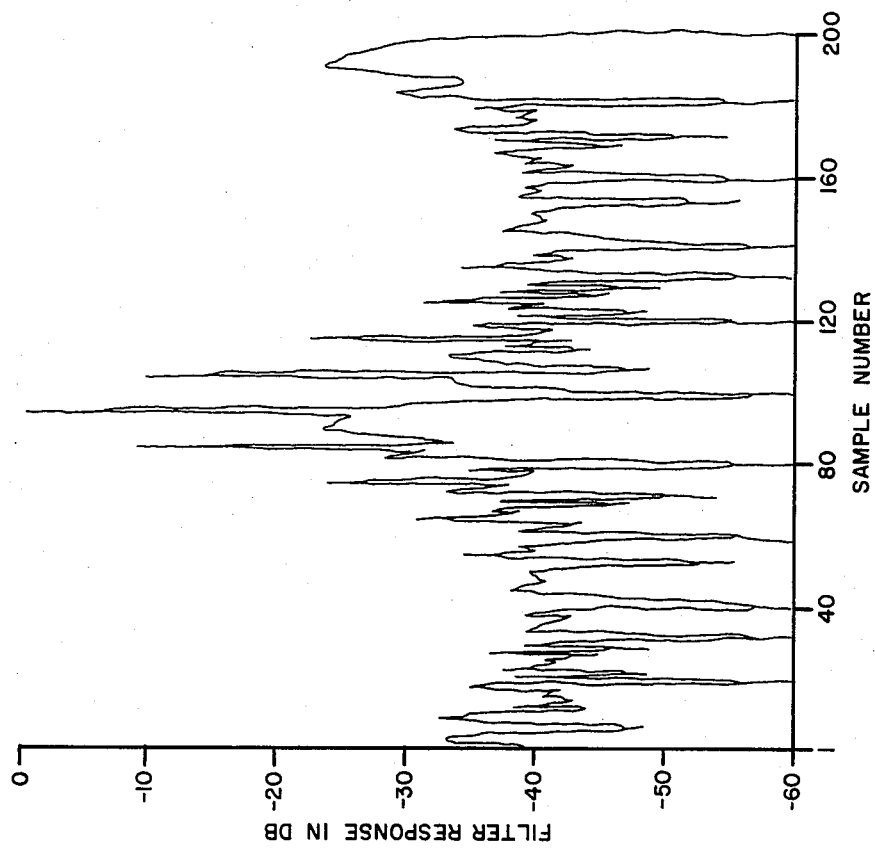
FIG. 5 is the autocorrelation function obtained with the prior art pulse expander-compressor when subject to a Doppler shift equal to 5% of the bandwidth and no bandwidth limitation.
Figure 4:
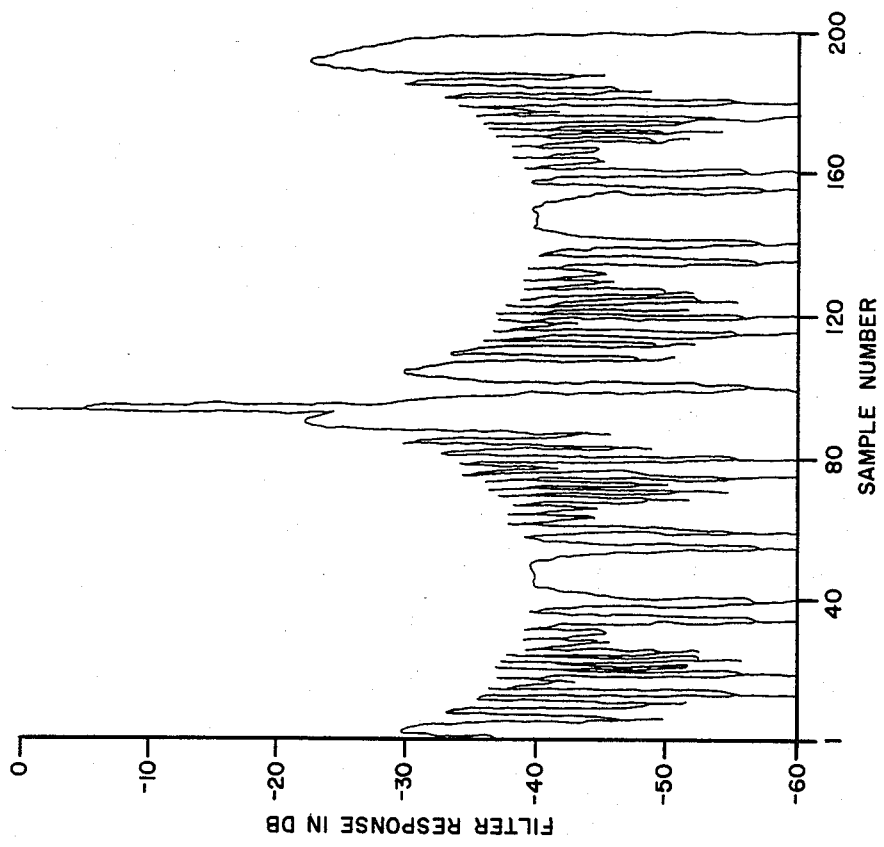
FIG. 4 is the autocorrelation function obtained with the pulse-expander-compressor shown in FIG. 1 with a Doppler shift equal to 5% of the bandwidth and no bandwidth limitation.

FIG. 4 illustrates the effect of a Doppler shift equal to 5% of the bandwidth on the autocorrelation function obtained with the compressor shown in FIG. 1. FIG. 5 illustrates, for comparison purposes, the compressed pulse that results using the Cantrell compressor with this Doppler shift. Note that the undesirable large grating lobes that appear with Doppler in the autocorrelation function obtained with the Cantrell compressor are absent from the autocorrelation function obtained with

|  | The y Outputs from the ISEM (13) are | | | | The x Inputs to the DFT are | | | |
|---|---|---|---|---|---|---|---|---|
|  | y(0) | y(1) | y(2) | y(3) | x(0) | x(1) | x(2) | x(3) |
| 1st clock pulse: | 1 | 0 | 0 | 0 | 1 | 0 | 0 | 0 |
| 2nd clock pulse: | 0 | 1 | 0 | 0 | 0 | $e^{-j\pi/16}$ | 0 | 0 |
| 3rd clock pulse: | 0 | 0 | 1 | 0 | 0 | 0 | $e^{-j4\pi/16}$ | 0 |
| 4th clock pulse: | 0 | 0 | 0 | 1 | 0 | 0 | 0 | $e^{-j9\pi/16}$ |
| 5th etc. clock pulse: | 0 | 0 | 0 | 0 |  |  |  |  |

|  | The s Outputs from the DFT are | | | | The z Outputs from the weighting means are | | | |
|---|---|---|---|---|---|---|---|---|
|  | s(0) | s(1) | s(2) | s(3) | z(0) | z(1) | z(2) | z(3) |
| 1st clock pulse: | 1 | 1 | 1 | 1 | 1 | −1 | 1 | −1 |
| 2nd clock pulse: | $e^{-j\pi/16}$ | $e^{-j9\pi/16}$ | $e^{-j17\pi/16}$ | $e^{-j25\pi/16}$ | $e^{-j\pi/16}$ | $e^{-j25\pi/16}$ | $e^{-j17\pi/16}$ | $e^{-j9\pi/16}$ |
| 3rd clock pulse: | $e^{-j4\pi/16}$ | $e^{-j20\pi/16}$ | $e^{-j4\pi/16}$ | $e^{-j20\pi/16}$ | $e^{-j4\pi/16}$ | $e^{-j4\pi/16}$ | $e^{-j4\pi/16}$ | $e^{-j4\pi/16}$ |
| 4th clock pulse: | $e^{-j9\pi/16}$ | $e^{-j\pi/16}$ | $e^{-j25\pi/16}$ | $e^{-j17\pi/16}$ | $e^{-j9\pi/16}$ | $e^{-j17\pi/16}$ | $e^{-j25\pi/16}$ | $e^{-j\pi/16}$ |

These outputs are fed to the phase modulator 52 through the FSTDM adders and delays. For the first four clock pulses, the only inputs to the modulator are the signals on the z(2) line; for the next four clock pulses, the signals on the z(3) line; for the next four, the signals on the z(0) line; and for the next four, the signals on the z(1) line. This signal modulates the phase of the transmitter carrier wave. Note that the output signal extends over 16 clock pulse periods. The phase-modulated carrier is propagated through space and, if the signal strikes a target, an echo signal is returned. This echo signal is processed through the receiver 60 the compressor of the present invention.

Figure 6:
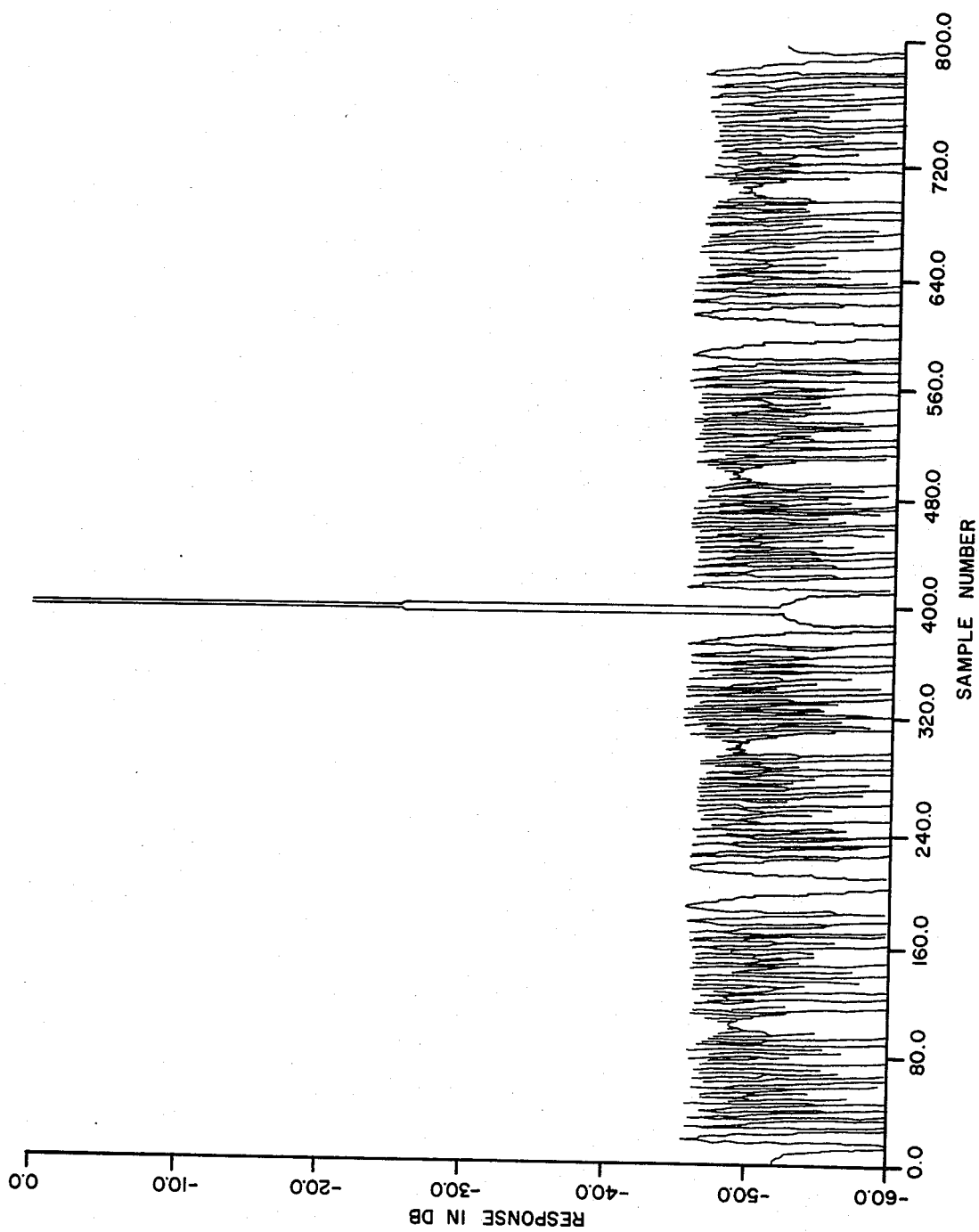
FIG. 6 is the autocorrelation function obtained with the pulse-expander-compressor shown in FIG. 1 when subject to bandwidth limitation.
Figure 7:
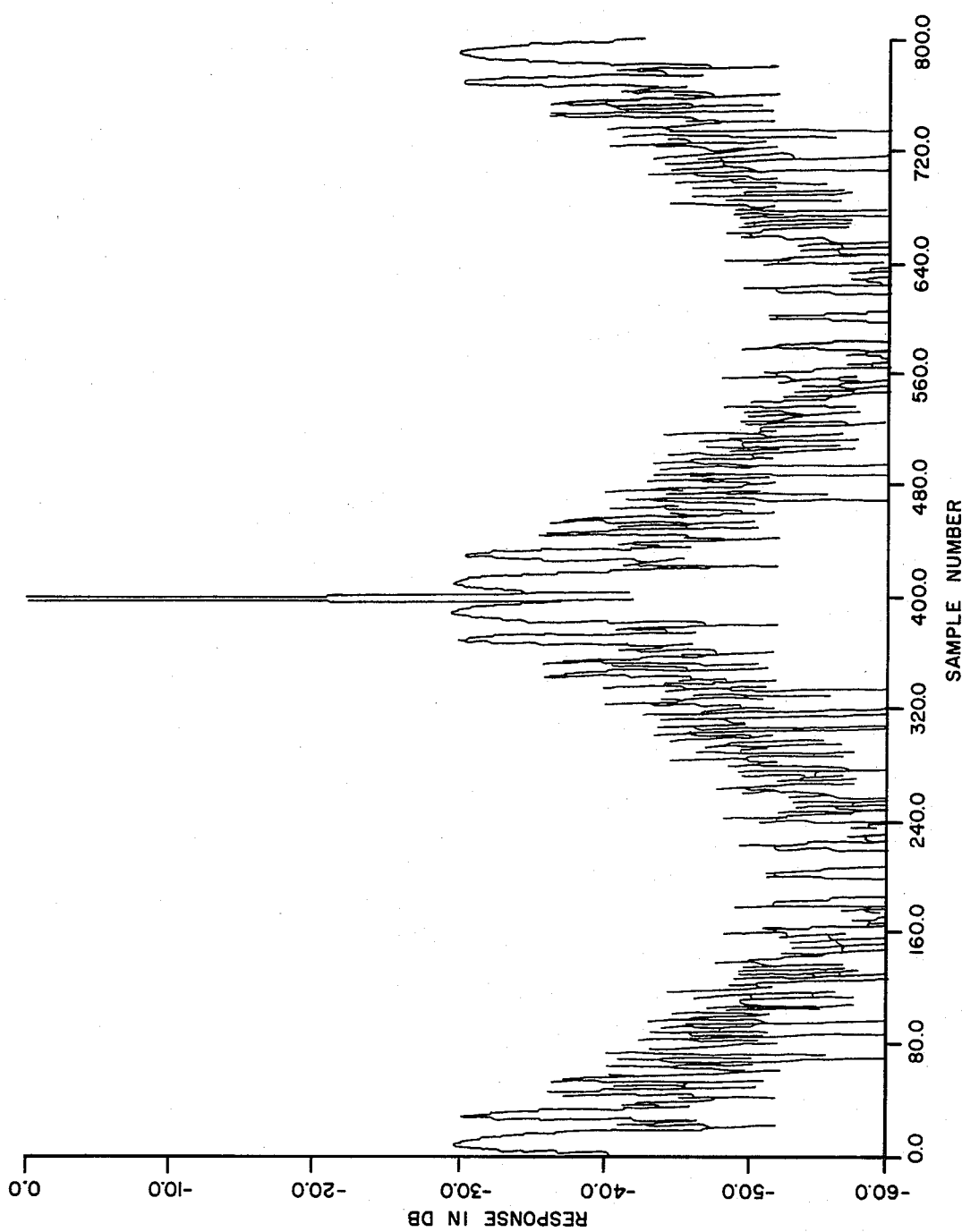
FIG. 7 is the autocorrelation function obtained with the prior art pulse-expander-compressor when subject to bandwidth limitation.

FIG. 6 illustrates the effect of precompression band-limiting on the autocorrelation function obtained with the compressor shown in FIG. 1 (and pulse compression ratio p=400). FIG. 7 illustrates for comparison purposes, the compressed pulse that results using the Cantrell compressor with bandwidth limitation. Note that the degradation of the peak-to-sidelobe ratio of the autocorrelation function obtained in the Cantrell compressor is absent from the autocorrelation function obtained with the compressor of the present invention.

Thus, there has been provided a new and improved digital pulse-expander-compressor having increased Doppler tolerance and precompression bandwidth tolerance.

Obviously, many modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. In a digital pulse expander-compressor,
input-signal expansion means responsive to an applied pulse for successively generating N replicas y(n) of the pulse, where n=0,1,2, . . . , N−1 and N is an integer, in a time which is N times the length of the pulse;
weighting means connected to the input-signal expansion means and having N output terminals for weighting the replicas y(n) in accordance with the formula $$z(k) = \sum_{n=0}^{N-1} y(n)e^{-j\pi(k+\frac{2nk}{N}+\frac{n2}{N2})}$$

where k=0,1,2, . . . , N−1, to provide N weighted pulses z(k), each at a respective one of the N output terminals, whenever one of the N replicas y(n) is generated; and
time-dispersion means connected to the weighting means for delaying each of the N weighted pulses z(k) corresponding to any replica of the applied pulse by a time which is determined by cyclically permutating, R/2 times, the values of k assigned to the N weighted pulses, and then multiplying the newly assigned value of k of said each one of the N weighted pulses z(k) by N times the length of the applied pulse, where R equals N if N is an even integer, and R equals (N−1) if N is an odd integer.

2. The pulse expander-compressor recited in claim 1 wherein the weighting means includes:
a discrete Fourier transform circuit.

3. The pulse expander-compressor recited in claim 2 wherein the weighting means includes:
a plurality of inverters, a respective inverter being connected to every other output of the discrete Fourier transform circuit.

4. In a digital pulse expander-compressor,
input-signal expansion means responsive to an applied pulse for successively generating N replicas y(n) of the pulse, where n=0,1,2, . . . , N−1 and N is an integer, in a time which is N times the length of the pulse;
weighting means connected to the input-signal expansion means and having N output terminals for weighting the replicas y(n) in accordance with the formula $$z(k) = \sum_{n=0}^{N-1} y(n)e^{-j\pi(k+\frac{2nk}{N}+\frac{n2}{N2})}$$

where k=0,1,2, . . . , N−1, to provide N weighted pulses z(k), each at a respective one of the N output terminals, whenever one of the N replicas y(n) is generated,
the weighting means including a discrete Fourier transform circuit, a plurality of phase-shifters, a respective phase-shifter being connected to every input of the discrete Fourier transform circuit except the first input, and a plurality of inverters, a respective inverter being connected to every other output of the discrete Fourier transform circuit; and
time-dispersion means connected to the weighting means for delaying each of the N weighted pulses z(k) corresponding to any replica of the applied pulse by a time which is determined by cyclically permutating, R/2 times, the values of k assigned to the N weighted pulses z(k) and then multiplying the newly assigned value of k of said each one of the N weighted pulses z(k) by N times the length of the applied pulse, where R equals N if N is an even integer, and R equals (N−1) if N is an odd integer.

5. The pulse expander-compressor recited in claim 4 wherein the time-dispersion means includes:
a plurality of adders and delay stages connected in series,
the adders alternating with the delay stages.

6. The pulse expander-compressor recited in claim 5 wherein:
each adder is connected to a respective one of the N output terminals of the weighting means.

7. The pulse expander-compressor recited in claim 6 wherein:
each of the delay stages provides a delay that is N times the length of the applied pulse.

8. In a digital pulse expander-compressor,
input-signal expansion means respnsive to an applied pulse for successively generating N replicas y(n) of the pulse, where n=0,1,2, . . . , N−1 and N is an integer, in a time which is N times the length of the pulse;
weighting means connected to the input-signal expansion means and having N output terminals for weighting the replicas y(n) in accordance with the formula $$z(k) = \sum_{n=0}^{N-1} y(n)e^{-j\pi(k+\frac{2nk}{N}+\frac{n2}{N2})}$$

where k=0,1,2, . . . , N−1, to provide N weighted pulses z(k), each at a respective one of the N output terminals, whenever one of the N replicas y(n) is generated,
the weighting means including a discrete Fourier transform circuit, a plurality of phase-shifters, a respective phase-shifter being connected to every input of the discrete Fourier transform circuit except the first input, and a plurality of inverters, a respective inverter being connected to every other output of the discrete Fourier transform circuit; and
a plurality of adders and delay stages connected in series, the adders alternating with the delay stages, each adder being connected to a respective one of the N output terminals of the weighting means, each of the delay stages providing a delay that is N times the length of the applied pulse, the adders being connected in R/2-fold cyclically permutated order to the N output terminals, where R equals N 9. In a method of digitally expanding and compressing pulses, the steps of:

successively generating N replicas y(n) of an applied pulse, where n=0,1,2, ..., N−1 and N is an integer, in a time which is N times the length of the pulse;

weighting the replicas y(n) in accordance with the formula $$z(k) = \sum_{n=0}^{N-1} y(n) e^{-j\pi(k + \frac{2nk}{N} + \frac{n^2}{N^2})}$$

where k=0,1,2, ..., N−1, to provide N weighted pulses z(k) whenever one of the N replicas y(n) is generated; and delaying each of the N weighted pulses z(k) corresponding to any replica of the applied pulse by a time which is determined by cylically permutating, R/2 times, the values of k assigned to the N weighted pulses z(k) and then multiplying the newly assigned value of k of said each one of the N weighted pulss z(k) by N times the length of the applied pulse, where R equals N if N is an even integer, and R equals (N−1) if N is an odd integer.

* * * * *